(12) United States Patent
Van Straaten et al.

(10) Patent No.: US 9,981,706 B2
(45) Date of Patent: May 29, 2018

(54) BICYCLE STAND

(71) Applicant: Willem Johannes Van Straaten, Sandton (ZA)

(72) Inventors: Willem Johannes Van Straaten, Sandton (ZA); Andrea Van Straaten, Sandton (ZA)

(73) Assignee: Willem Johannes Van Staaten, Sandton (ZA)

( * ) Notice: Subject to any disclaimer, the term of this patent is extended or adjusted under 35 U.S.C. 154(b) by 0 days. days.

(21) Appl. No.: 15/386,037

(22) Filed: Dec. 21, 2016

(65) Prior Publication Data
US 2017/0174280 A1    Jun. 22, 2017

(30) Foreign Application Priority Data
Dec. 21, 2015   (ZA) .................................. 2015/09264

(51) Int. Cl.
*B62H 3/08*   (2006.01)
*B62H 3/02*   (2006.01)

(52) U.S. Cl.
CPC ................. *B62H 3/08* (2013.01); *B62H 3/02* (2013.01)

(58) Field of Classification Search
CPC ... B62H 3/08; B62H 3/00; B62H 3/02; B62H 3/04; B62H 3/06
See application file for complete search history.

(56) References Cited

U.S. PATENT DOCUMENTS

| 4,026,546 | A | * | 5/1977 | Omori | A63B 69/16 211/22 |
|---|---|---|---|---|---|
| 4,352,432 | A | * | 10/1982 | Smith | B62H 3/08 211/19 |
| 4,437,597 | A | * | 3/1984 | Doyle | B60R 9/10 211/20 |
| 5,246,120 | A | * | 9/1993 | Walker | B62H 3/12 211/19 |
| 5,702,007 | A | * | 12/1997 | Fritz | B62H 3/08 211/17 |
| 5,743,411 | A | * | 4/1998 | Hawkes | B62H 3/04 211/19 |
| 5,941,397 | A | * | 8/1999 | Buchanan | B62H 3/12 211/19 |
| 6,371,309 | B1 | * | 4/2002 | Smith | B62H 3/12 211/17 |
| 6,640,979 | B1 | * | 11/2003 | Mayfield | B62H 3/00 211/20 |
| D604,206 | S | * | 11/2009 | Selzer | D12/115 |
| D632,228 | S | * | 2/2011 | Marin | D12/115 |
| 2013/0092645 | A1 | * | 4/2013 | Kedar | B62H 3/04 211/85.1 |
| 2013/0334150 | A1 | * | 12/2013 | Watson | B62H 3/08 211/20 |

* cited by examiner

*Primary Examiner* — Ko H Chan
(74) *Attorney, Agent, or Firm* — Young & Thompson

(57) ABSTRACT

A bicycle stand which includes a frame with a first channel support and a transversely extending second channel support which are configured to engage with parts of a rim of a bicycle wheel.

6 Claims, 3 Drawing Sheets

BICYCLE STAND

BACKGROUND OF THE INVENTION

This invention relates to a bicycle stand.

A need exists for a capability to store a bicycle effectively without resting the bicycle against a wall and possibly damaging the wall or taking up too much space. Generally bicycle stands are bulky and are only suitable for outdoor use such as in a school yard or in a parking lot.

In modern living conditions in confined spaces there is a requirement for a bicycle stand which is light, compact and quick and easy to use and which can be manufactured at a low cost.

An object of the present invention is to provide a bicycle stand which addresses, at least to some extent, the aforementioned requirements.

SUMMARY OF THE INVENTION

The invention provides a bicycle stand which includes a frame which includes a first elongate member with an inner end and an outer end, a second elongate member with a first end and a second end, and a structure, for stabilizing the elongate members on a support surface when the frame is in an operative mode in which the first elongate member is on the support surface and the second elongate member extends upwardly, and wherein the first elongate member and the second elongate member include respective formations which are engageable with a wheel of a bicycle.

The first end of the second elongate member may be secured directly or indirectly to at least one, but preferably both, of the stabilizing structure and the first elongate member. A direct connection may be made between these components. Alternatively a connection may be established through the intermediary of a suitable connecting member or block which is used to couple the components to one another.

Preferably the first elongate member is movable relative to the second elongate member to place the frame in a storage mode in which the first and second elongate members are substantially parallel to each other. The first elongate member may be attached to the second elongate member with a hinge mechanism which allows the aforementioned action to take place. Alternatively the first elongate member is attached to the second elongate member using fasteners which can be released so that, at least for storage or transport purposes, the first elongate member may be adjacent the second elongate member and, as appropriate, the elongate structure may also be positioned adjacent the elongate member in a compact configuration.

The respective wheel-engaging formation on the first elongate member may include a first channel which, with the frame in the operative mode, faces upwardly.

Similarly the respective wheel-engaging formation on the second elongate member may include a second channel.

Preferably with the frame in the operative mode, an upper surface of the first elongate member slopes downwardly from the outer end to the inner end, towards the second elongate member.

The stand may include a pedestal which, with the frame in the operative mode, elevates the outer end of the first elongate member relative to the second end.

In one form of the invention the wheel-engaging formation on the first elongate member additionally or alternatively includes a nub which extends upwardly at the outer end of the first elongate member.

The frame may include a retaining member at or near the second end of the second elongate member which, with the frame in the operative mode, is configured to engage with a part of a bicycle when a first wheel of the bicycle is engaged, at least, with the wheel-engaging formation on the first elongate member, and a second wheel of the bicycle is positioned above the first wheel.

Preferably the position of the retaining member relative to the first elongate member is adjustable thereby to accommodate a variation in bicycle size.

The invention further extends to a bicycle stand which includes a frame with a first elongate member with an inner end, an outer end and a first channel formation, a second elongate member with a first end, a second end and a second channel formation, and a stabilizing structure, and wherein, with the frame in an operative mode, the first elongate member is on the ground, the first channel formation faces upwardly, the second elongate member extends upwardly with the second end above the first end and the second channel formation faces towards the direction of the outer end of the first elongate member, the stabilizing structure comprising a cross piece which includes a first arm which extends to one side of the first elongate member and a second arm which extends to an opposing side of the first elongate member, and wherein the first and second channel formations are configured to receive and engage with respective sections of a bicycle wheel.

The first end of the second elongate member may be secured to the inner end of the first elongate member. This may be done directly by means of suitable fasteners or indirectly through the use of an appropriate coupling or connecting block. The first end of the second elongate member may for example be secured to the stabilizing structure. The stabilizing structure may then be attached to the first elongate member. The cross piece may be of an integral nature. This means that the first arm is integral with the second arm. In a variation of the invention the cross piece includes the first and second arms which are separately fabricated but which are fixed or otherwise connected to the first elongate member, the second elongate member or both members in any appropriate way.

The positioning of the various components is such that an outer end of the first arm, an outer end of the second arm and the outer end of the first elongate member are respectively positioned at apices of a triangle and the center of gravity of a bicycle, supported by the bicycle stand, then lies within the boundaries of the triangle to achieve a stable configuration.

BRIEF DESCRIPTION OF THE DRAWINGS

The invention is further described by way of example with reference to the accompanying drawings in which.

DESCRIPTION OF PREFERRED EMBODIMENT

Figure 1:
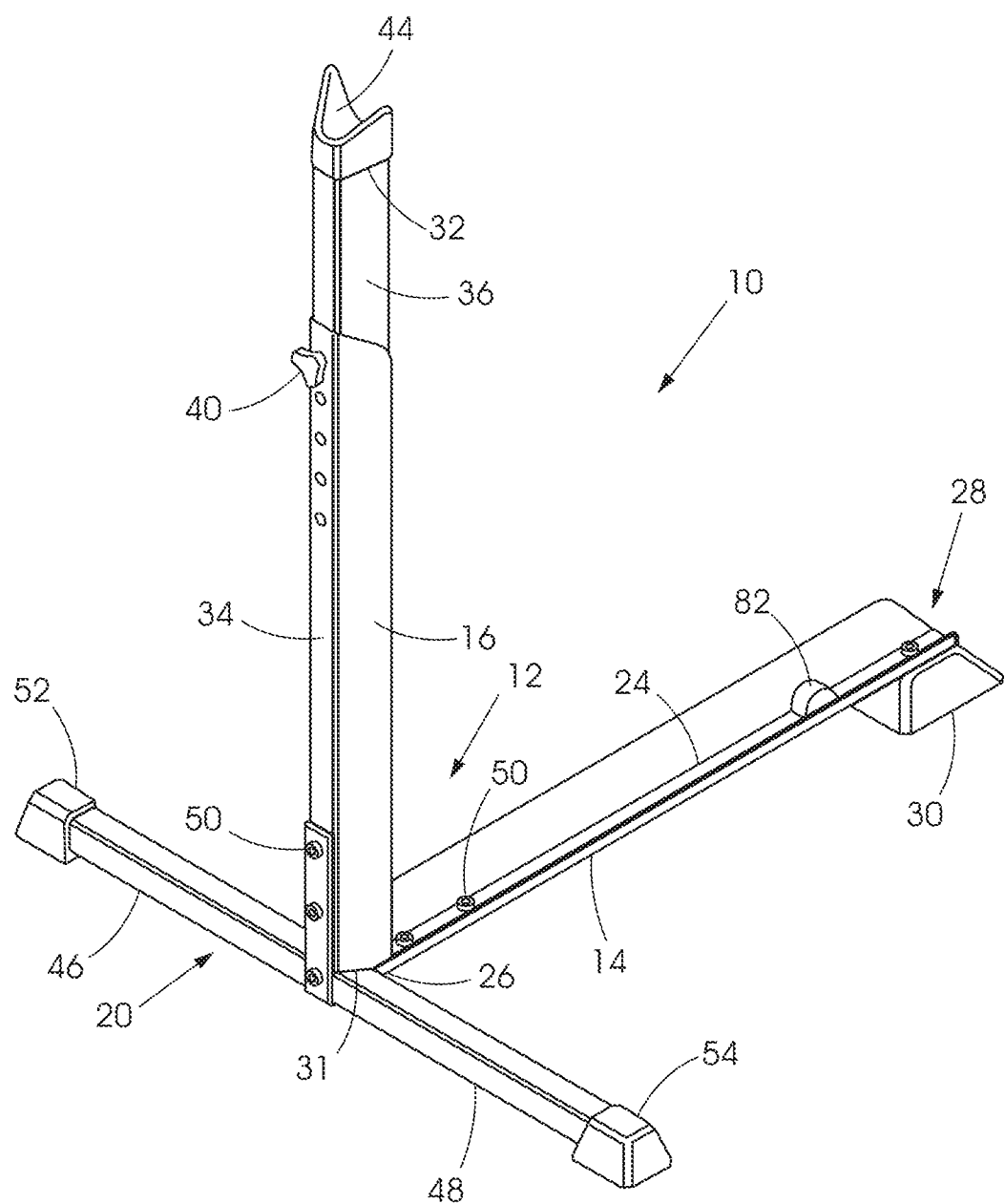
FIG. 1 is a perspective view of a bicycle stand according to the invention.
Figure 2:
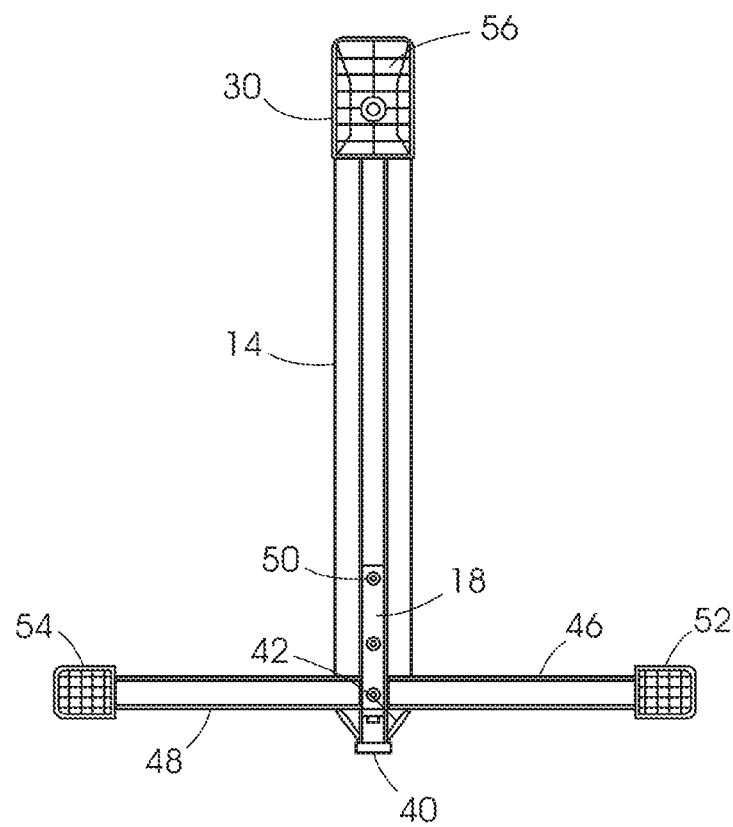
FIG. 2 is a plan view of the bicycle stand in FIG. 1.
Figure 3:
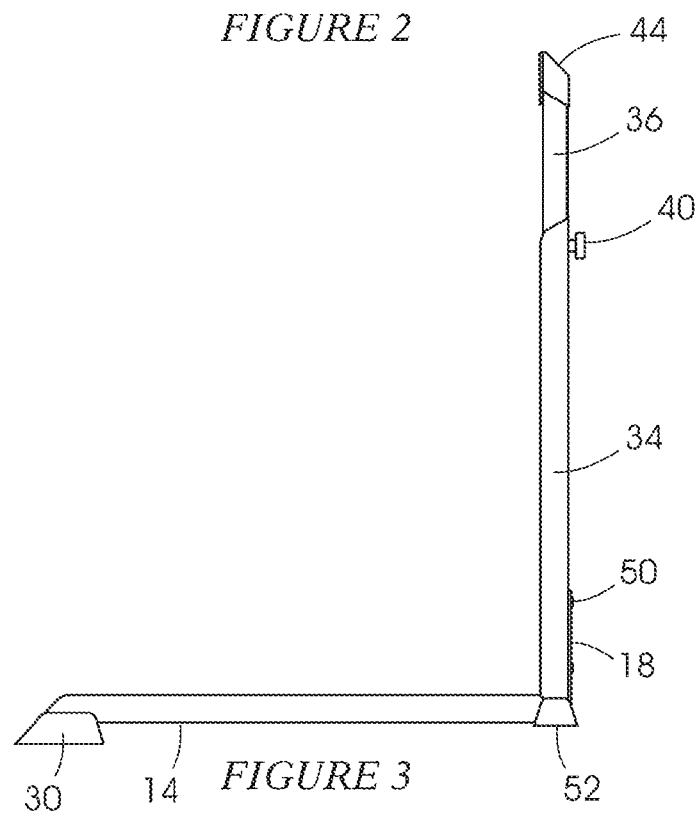
FIG. 3 is a side view of the bicycle stand of FIG. 1.

FIGS. 1, 2 and 3 of the accompanying drawings illustrate in perspective, from one side, and in plan, respectively a bicycle stand 10 according to the invention.

The bicycle stand 10 includes a frame 12 which is formed from a first elongate member 14, a second elongate member 16, an angle bracket 18 and a stabilizer in the form of a cross piece 20.

The first elongate member 14 has a first longitudinally extending channel formation 24, an inner end 26 and an outer end 28. A small pedestal 30 is fixed to an underside of the outer end 28.

The second elongate member 16 has a lower, first end 31 and an upper, second end 32 and includes a lower section 34 and an upper section 36 which is telescopically mounted to the lower section 34. The sections 34 and 36 are adjustably connected to each other by means of one or more fasteners 40. At least the lower section 34 has a second longitudinally extending channel formation 42 which is oriented to face towards the outer end of the first elongate member 14. A retaining member 44 is fixed to the second end 32 of the second elongate member 16.

The cross piece 20 extends transversely to the two elongate members 14 and 16. The cross piece has a first arm 46 which is positioned on one side of the first elongate member 14 and a second arm 48 which is positioned on an opposing side of the elongate member 14. In this example of the invention the cross piece has an integral construction and the first arm 46 is integral with the second arm 48. In a variation of the invention the two arms are separately formed and are assembled, in a similar configuration to what is shown, using any suitable interconnecting or coupling member. The angle bracket 18 is configured to extend around a lower side of the inner end 26, across a lower and a side surface of the cross piece 20, and then upwardly on an outer side of the first end 31 of the second elongate member 16. The angle bracket 18 is fixed to the elongate members 14 and 16 and to the cross piece 20 by means of various fasteners 50. Any other suitable arrangement for fixing the cross piece to one or both of the elongate members could be employed.

Opposing ends of the cross piece 20 carry protective and non-sliding pads 52 and 54 respectively. Similarly an underside of the pedestal 30 also carries a non-slip material 56.

The frame 12 can be provided to a user in a knock-down form wherein the first elongate member 14, the second elongate member 16 and the cross piece 20 are disposed parallel to and abutting one another. This feature facilitates transport of the frame 12 and storage of the frame 12, when not in use. It is possible, although the resulting construction then becomes more complex than what is illustrated, to interconnect the first elongate member, the second elongate member and the cross piece to one another using hinge-type joints which allow the various components to be moved to a storage position in which, as stated, they are substantially parallel to one another or to an operative position at which, as described, the first elongate member is on the ground, the second elongate member extends upwardly and the cross piece extends transversely to the two elongate members.

The frame 12 is readily assembled to take up an operative mode, which is the configuration shown in FIGS. 1, 2 and 3, through the use of the various fasteners.

Figure 4:
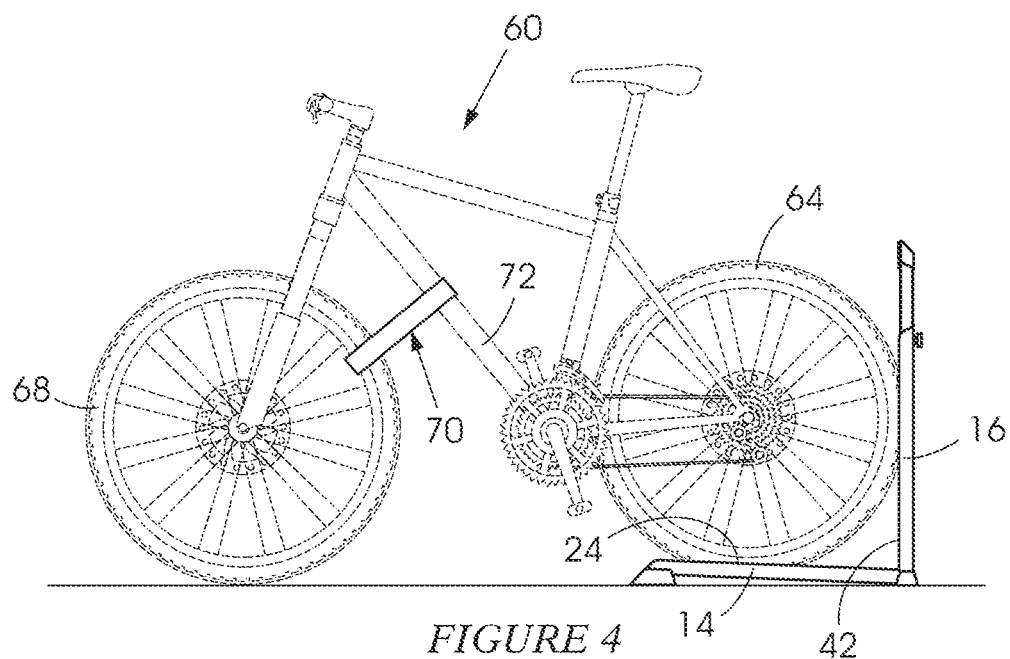
FIG. 4 is a side view of the stand illustrating one form of use thereof with a bicycle.

FIG. 4 illustrates one way in which the bicycle stand 10 can be used to support a bicycle 60. With the frame 10 in the operative mode the first elongate member 14 is on a support surface e.g. the ground or a floor, and the second elongate member 16 extends upwardly. A rear wheel 64 of the bicycle 60 is placed in the first and second channel formations 24 and 42. The first channel formation 24 as noted, slopes downwardly towards the second elongate member 16 and the rear wheel 64 thus, automatically, is moved towards the second elongate member 16 due to gravity action. The frame 12 is stabilized by means of the cross piece 20 and a firm support is provided for the bicycle as the first and second channel formations 24 and 42 engage with separate and spaced apart sections of the rear wheel 64. The outer ends of the cross piece and the outer end of the first elongate member are at apices of a triangle and the centre of gravity of the bicycle is positioned above but inside the boundary of the triangle. To prevent the front wheel 68 of the bicycle from moving in an unwanted manner a stay 70 is used. The stay 70 is conveniently in the form of a flexible strap which is looped around a frame component 72 of the bicycle and the front wheel 68 and is then pulled taut.

Figure 5:
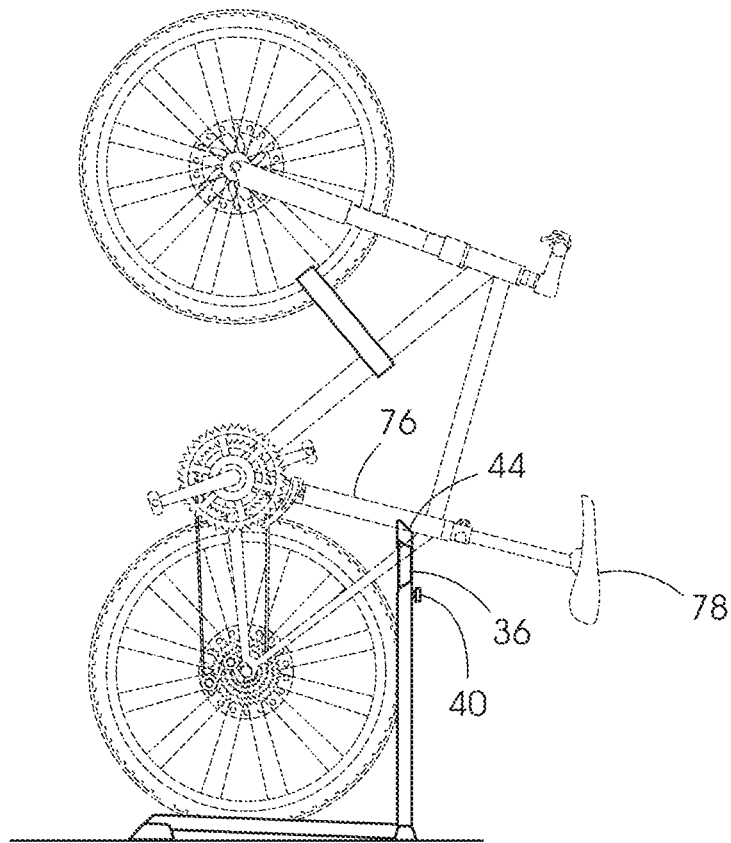
FIG. 5 is similar to FIG. 4 but illustrating a different way in which the stand can be used with a bicycle.

With the bicycle 60 in the FIG. 4 position it is possible to move the bicycle to take up a different storage position as is shown in FIG. 5. All that is necessary is that the rear wheel 64 is kept engaged with the elongate members 14 and 16 while the front wheel 68 is elevated, moving through an arc of about 90°, so that the front wheel 68 is thereby brought to a position at which it is more or less above the rear wheel 64. At this stage the height of the upper section 36 of the second elongate member 16 is adjusted, as necessary, by releasing the fastener 40 and moving the retaining member 44 so that it is moved into firm engagement with a shaft or similar component 76 of the bicycle which supports a saddle 78 of the bicycle on a frame of the bicycle. Conveniently the retention member has a fork-shape and, once engaged with the component 76, the retaining member 44 is urged downwardly and the fastener 40 is then tightened so that the bicycle is kept firmly in the position shown in FIG. 5.

In a variation of the invention a nub 82 (see FIG. 1) is located in the first channel formation 24 so that the wheel 64 of the bicycle must be moved over the nub 82 before a section of the wheel can be moved towards, and possibly then enter, the second channel formation 42. The nub helps to maintain the wheel engaged with the frame. If required, the use of the nub allows the pedestal 30 to be eliminated and the first channel formation 24 would then, in use, be substantially level and would not be inclined.

In the storage mode shown in FIG. 5 the saddle 78 of the bicycle is close to the retaining member 44. This storage configuration is readily used if, say, the rear wheel 64 does not include a mudguard. If a mudguard is placed over the rear wheel then it may be necessary to alter the shapes of the first and second elongate members so that they can comfortably accommodate the mudguard and not damage the mudguard.

In a variation of the bicycle stand the length of the second elongate member 16 is increased to what is shown in the various drawings. It is then possible, with relative ease, to engage the bicycle with the bicycle stand by guiding the front wheel into the first elongate member and then up the channel in the second elongate member until the rear wheel enters the channel formation in the first elongate member. The orientation of the bicycle is then displaced by 180° from what is shown in FIG. 5. The retaining member 44 has a different configuration and is adapted in shape to engage with a portion of the front wheel 68 of the bicycle in a stable arrangement.

The invention claimed is:

1. A bicycle stand, comprising:
   a frame, including
      a first elongate member with an inner end, an outer end and a first channel formation,
      a second elongate member with a first end, a second end and a second channel formation,
      a retaining member at or near the second end of the second elongate member, and a stabilizing structure, wherein, with the frame in an operative mode, the first elongate member is configured so as to be on the ground, the first channel formation faces upwardly, the second elongate member extends upwardly, and the second channel formation faces towards the direction of the outer end of the first elongate member, the stabilizing structure including a first arm which extends to one side of the first elongate member and a second arm which extends to an opposing side of the first elongate member, wherein the first and second channel formations are configured to receive and engage with respective sections of a rear wheel of a bicycle in a first storage position such that a front wheel of the bicycle is on the ground, wherein the retaining member is engageable with a component of the bicycle in a second storage position such that the front wheel of the bicycle is elevated to be above the rear wheel, and wherein the first elongate member is movable relative to the second elongate member to place the frame in a storage mode in which the first and second elongate members are substantially parallel to each other.

2. The bicycle stand according to claim 1, wherein the first end of the second elongate member is secured to the inner end of the first elongate member.

3. The bicycle stand according to claim 1, wherein the first arm is integrally formed with the second arm.

4. The bicycle stand according to claim 1, wherein the retaining member is engageable with a component which supports a seat of the bicycle on a frame of the bicycle.

5. The bicycle stand according to claim 1 in combination with a stay which is configured to restrain movement of the front wheel of the bicycle relative to a frame of the bicycle with the bicycle in the first storage position or in the second storage position.

6. The bicycle stand of claim 1, wherein, with the frame in said operative mode, the first channel formation is downwardly inclined from the outer end towards the inner end, and the downwardly inclined first channel formation configured such to cause the bicycle, in each of the first storage position and the second storage position, to be urged towards the second channel formation.

\* \* \* \* \*